(12) United States Patent
Shinoda et al.

(10) Patent No.: US 9,273,640 B2
(45) Date of Patent: Mar. 1, 2016

(54) EXHAUST GAS CONTROL APPARATUS FOR INTERNAL COMBUSTION ENGINE

(75) Inventors: Yoshihisa Shinoda, Susono (JP); Keisuke Sano, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 404 days.

(21) Appl. No.: 13/704,879

(22) PCT Filed: Jun. 18, 2010

(86) PCT No.: PCT/JP2010/060366
§ 371 (c)(1),
(2), (4) Date: Dec. 17, 2012

(87) PCT Pub. No.: WO2011/158375
PCT Pub. Date: Dec. 22, 2011

(65) Prior Publication Data
US 2013/0086893 A1 Apr. 11, 2013

(51) Int. Cl.
*F02M 25/06* (2006.01)
*F02M 25/07* (2006.01)
(Continued)

(52) U.S. Cl.
CPC ............ *F02M 25/0703* (2013.01); *F02B 47/08* (2013.01); *F02D 19/0636* (2013.01); *F02D 19/0647* (2013.01); *F02D 19/084* (2013.01); *F02D 19/087* (2013.01); *F02D 41/0055* (2013.01); *F02M 25/0718* (2013.01); *F02M 25/0731* (2013.01); *F02M 25/0751* (2013.01);
(Continued)

(58) Field of Classification Search
CPC ............... F02B 47/08; F02B 2075/125; F02D 19/0636; F02D 19/0647; F02D 19/084; F02D 19/087; F02D 41/0055; F02D 19/0692; F02D 37/02; F02M 25/0703; F02M 25/0718; F02M 25/0731; F02M 25/0751; F02P 5/1516; F01N 2570/00; F01N 2570/12; F01N 3/101
USPC ........................ 60/274, 278, 299, 323, 324
See application file for complete search history.

(56) References Cited

U.S. PATENT DOCUMENTS 6,301,888 B1 * 10/2001 Gray, Jr. ................... 60/605.2
2004/0093866 A1 * 5/2004 Ishikawa ................... 60/605.2
(Continued)

FOREIGN PATENT DOCUMENTS

JP 5-30453 U 4/1993
JP 5-209558 A 8/1993
(Continued)

*Primary Examiner* — Thomas Denion
*Assistant Examiner* — Matthew T Largi
(74) *Attorney, Agent, or Firm* — Sughrue Mion, PLLC

(57) ABSTRACT

An exhaust gas control apparatus (100) of an internal combustion engine (200) of a vehicle, which is provided with: the internal combustion engine which can use fuel containing methane in exhaust gas; an exhaust gas purifying apparatus (300) disposed in an exhaust passage of the internal combustion engine; an EGR passage (400) which can recirculate the exhaust gas to an intake passage of the internal combustion engine, in a HPL path which does not include the exhaust gas purifying apparatus; and an adjusting device (407) which can adjust an exhaust gas recirculation amount in the EGR passage, is provided with: a first specifying device for specifying a methane concentration in the exhaust gas; and a first controlling device for controlling the adjusting device to increase an exhaust gas recirculation amount in the HPL path if the specified methane concentration is greater than or equal to a reference value.

5 Claims, 3 Drawing Sheets

(51) Int. Cl.
*F02P 5/15* (2006.01)
*F02B 47/08* (2006.01)
*F02D 19/08* (2006.01)
*F01N 3/10* (2006.01)
*F02B 75/12* (2006.01)
*F02D 37/02* (2006.01)
*F02D 41/00* (2006.01)
*F02D 41/02* (2006.01)
*F02D 41/14* (2006.01)
*F02D 19/06* (2006.01)

(52) U.S. Cl.
CPC ............... *F02P 5/1516* (2013.01); *F01N 3/101* (2013.01); *F01N 2570/00* (2013.01); *F01N 2570/12* (2013.01); *F02B 2075/125* (2013.01); *F02D 19/0692* (2013.01); *F02D 37/02* (2013.01); *F02D 41/0027* (2013.01); *F02D 41/0245* (2013.01); *F02D 41/1456* (2013.01); *F02D 41/1466* (2013.01); *F02M 25/0796* (2013.01); *Y02T 10/22* (2013.01); *Y02T 10/36* (2013.01); *Y02T 10/46* (2013.01); *Y02T 10/47* (2013.01)

(56) References Cited

U.S. PATENT DOCUMENTS

| | | | |
|---|---|---|---|
| 2006/0011180 A1* | 1/2006 | Sasaki et al. | 123/698 |
| 2010/0018187 A1* | 1/2010 | Matsumoto et al. | 60/286 |
| 2010/0186727 A1* | 7/2010 | Kaneko | 123/568.21 |
| 2014/0041367 A1* | 2/2014 | Balthes et al. | 60/274 |

FOREIGN PATENT DOCUMENTS

| | | | |
|---|---|---|---|
| JP | 2000-320440 A | | 11/2000 |
| JP | 2008-267308 A | | 11/2008 |
| JP | 2009-121412 A | | 6/2009 |
| JP | 2009-235909 A | | 10/2009 |
| JP | 2010-59879 A | | 3/2010 |
| JP | 2010059879 A | * | 3/2010 |

* cited by examiner

EXHAUST GAS CONTROL APPARATUS FOR INTERNAL COMBUSTION ENGINE

CROSS REFERENCE TO RELATED APPLICATIONS

This application is a National Stage of International Application No. PCT/JP2010/060366, filed on Jun. 18, 2010, the contents of all of which are incorporated herein by reference in their entirety.

TECHNICAL FIELD

The present invention relates to an exhaust gas control apparatus of an internal combustion engine provided with an exhaust gas recirculation (EGR) apparatus.

BACKGROUND ART

As this type of apparatus, there has been suggested an apparatus using the EGR apparatus to remove toxic substances in exhaust gas (e.g. refer to Non-Patent document 1). According to the EGR apparatus of the internal combustion engine disclosed in the non-patent document 1, at the time of low-temperature warm-up in which the temperature of a catalyst is lower than a temperature at which aldehyde can be removed, the exhaust gas is recirculated or returned from a downstream portion of the catalyst, and if the temperature of the catalyst is higher than the temperature at which aldehyde can be removed, the exhaust gas is recirculated from an upstream portion from the catalyst. Thus, it is considered that the emission of aldehyde in the low-temperature warm-up can be significantly reduced.

Incidentally, there has been also suggested an ignition timing control method for a natural gas vehicle, which suppresses exhaust temperature reduction by delaying ignition timing from optimal ignition timing by a predetermined period of time if the temperature of an exhaust gas purifying catalyst detected during idling or within a fixed time after the idling is lower than a catalyst active temperature (refer to Patent document 1). According to this apparatus, it is possible to effectively remove methane in the exhaust gas.

PRIOR ART DOCUMENT

Non-Patent Document

Non-Patent document 1: Japanese Utility Patent Application Laid Open No. Hei 5-030453

Patent Document

Patent document 1: Japanese Patent Application Laid Open No. 2000-320440

DISCLOSURE OF INVENTION

Subject to be Solved by the Invention

Some fuel of the internal combustion engine includes methane in the exhaust gas. In particular, compressed natural gas (CNG) containing mainly methane in fuel composition, ethanol-gasoline blended fuel containing a high concentration of ethanol, and the like, have significantly high methane content in the exhaust gas, in comparison with non-methane hydrocarbon (NMHC).

On the other hand, methane has a strong chemical bonding force, and a reaction temperature thereof causing an oxidation reaction is extremely high. For example, a 99% removal temperature, as a temperature which allows 99% of methane in the exhaust gas to be removed, is normally over 800 degrees C.

On the other hand, an opportunity in which the exhaust gas purifying apparatus reaches this type of high-temperature state is extremely limited to a small portion of an operation period of the internal combustion engine, such as cases where the internal combustion engine is continuously in a high-load state, and the frequency of occurrence thereof is lower than at least cases where the exhaust gas purifying apparatus remains in a lower-temperature state. Therefore, in the exhaust gas purifying apparatus, such as various catalyst apparatuses, the removal of methane tends to be insufficient.

Here, the apparatus disclosed in the non-patent document 1 has a technical idea of selectively supplying EGR gas from before and after the catalyst apparatus; however, the technical idea stands from the viewpoint of removing aldehyde by using the catalyst. Therefore, if the technical idea disclosed in the non-patent document 1 is applied to the removal of methane, the exhaust gas is extracted from the downstream portion of the catalyst in order to promote an increase in catalyst temperature, under the catalyst temperature that is less than a methane removal temperature.

However, as described above, the methane removal temperature is extremely high and is not in a temperature range which can be frequently reached in a normal operating range of the internal combustion engine. Thus, in practice, the exhaust gas is extracted from the downstream portion of the catalyst under most operating conditions, and the meaning of selecting an EGR path is practically lost, and the performance of methane removal is hardly improved, all of which are problematic.

As described above, the apparatus disclosed in the non-patent document 1 has such a technical problem that methane cannot be sufficiently removed in the case of using fuel containing methane in the exhaust gas. Incidentally, the patent document 1 mentions the methane removal, but there is no change in that the purification using the catalyst is premised, and there can be the same technical problem in the patent document 1.

In view of the above problems, it is therefore an object of the present invention to provide an exhaust gas control apparatus of an internal combustion engine capable of preferably reducing methane in exhaust gas.

Means for Solving the Subject

The above object of the present invention can be achieved by an exhaust gas control apparatus of an internal combustion engine of a vehicle, the vehicle comprising: the internal combustion engine which can use fuel containing methane in exhaust gas; an exhaust gas purifying apparatus disposed in an exhaust passage of the internal combustion engine; an EGR passage which can recirculate the exhaust gas to an intake passage of the internal combustion engine, in a HPL path which does not include the exhaust gas purifying apparatus; and an adjusting device which can adjust an exhaust gas recirculation amount in the EGR passage, said exhaust gas control apparatus comprising: a first specifying device for specifying a methane concentration in the exhaust gas; and a first controlling device for controlling the adjusting device to increase an exhaust gas recirculation amount in the HPL path if the specified methane concentration is greater than or equal to a reference value.

The vehicle of the present invention is provided with: the internal combustion engine, the exhaust gas purifying apparatus, the EGR passage, and the adjusting device.

The internal combustion engine of the present invention conceptually includes an engine capable of converting thermal energy associated with the combustion of fuel into kinetic energy and extracting the kinetic energy. Particularly, the internal combustion engine is an engine configured to use the fuel containing methane in the exhaust gas. As long as this type of fuel can be used, various practical aspects of the internal combustion engine, such as, for example, the number of cylinders, cylinder arrangement, a fuel injection form, a configuration of an intake/exhaust system, or a configuration of a valve train, are not limited.

The fuel containing methane in the exhaust gas can exist practically in a wide range if the extent of the methane concentration or methane content in the exhaust gas is not asked. For example, the fuel of the present invention may be CNG containing mainly methane, ethanol-gasoline blended fuel having high ethanol content, or the like. Alternatively, the fuel of the present invention may be various alcohol fuels, gasoline, or the like.

The exhaust gas purifying apparatus is an apparatus for purifying the exhaust gas, and it is, for example, a three-way catalyst capable of removing total hydro carbon (THC) containing methane and NMHC, CO (carbon monoxide), and NOx (nitrogen oxide), substantially simultaneously, by allowing an oxidation process of an oxidized substance (a reducing agent) and a reduction process of a reduced substance (an oxidizing agent) to proceed in parallel. Alternatively, the exhaust gas purifying apparatus may be various catalyst apparatuses, such as NOx storage reduction catalyst (NOx occlusion reduction catalyst) (NSR) and urea selective catalytic reduction (SCR).

The EGR passage is a passage which can recirculate one portion of the exhaust gas as the EGR gas, to the intake passage of the internal combustion engine (e.g. a position on a downstream side of a throttle valve and on an upstream side of an intake port). Here, in particular, the EGR passage of the present invention can recirculate the exhaust gas in the high pressure loop (HPL) path which does not include the exhaust gas purifying apparatus. The HPL path does not include the exhaust gas purifying apparatus, and the HPL path thus avoids temperature reduction and pressure reduction on the exhaust gas purifying apparatus, and recirculates the exhaust gas in an as high-temperature and high-pressure state as possible.

In view of the effect of the HPL path as described above, the EGR passage can have a passage portion which branches from the exhaust passage at least on the upstream side (cylinder side) of the exhaust gas purifying apparatus and which is connected to a proper site of the intake passage while keeping an internal communication.

However, a recirculation path for the exhaust gas in the EGR passage is not always only the HPL path. For example, the EGR passage may include a passage portion which extracts the exhaust gas from the downstream side of the exhaust gas purifying apparatus and which recirculates the exhaust gas to the intake passage. In this case, one portion of the passage portion may be shared with a passage portion which constitutes the HPL path. Alternatively, the passage portion may be made of a passage portion which is independent of the passage portion which constitutes the HPL path.

If the exhaust gas is extracted from the downstream side of the exhaust gas purifying apparatus, the exhaust gas gives one portion of thermal energy thereof to the exhaust gas purifying apparatus, and pressures loss is caused by the resistance of a passage of the exhaust gas purifying apparatus. Thus, although purification is promoted, the exhaust gas is low-temperature and low-pressure in comparison with the exhaust gas which is recirculated in the HPL path. Such a path means a so-called low pressure loop (LPL) path.

The EGR passage is provided with the adjusting device and is configured to adjust the exhaust gas recirculation amount. The adjusting device may be various valve apparatuses, such as, for example, various diaphragm valve apparatuses for driving a valve element in accordance with oil pressure or air pressure, a butterfly valve apparatus, and an electromagnetic valve apparatus for controlling the opening/closing operation of the valve element using an electromagnetic actuator.

According to the exhaust gas control apparatus of the internal combustion engine of the present invention, the methane concentration in the exhaust gas is specified by the first specifying device.

Here, the term, "specify", is a concept which broadly means to determine something as a value or a range which can be referred to in terms of control, and a practical aspect thereof is arbitrary, such as detect, calculate, estimate, identify, select, or obtain. Moreover, when a specification target (which is the methane concentration in the exhaust gas herein) is specified, a process is not limited as long as the specification target can be specified. For example, the specific target can be directly or indirectly specified on the basis of various physical quantities, controlled variables, index values, a physical state, a control state, and the like which correspond to the specification target in a one-to-one, one-to-many, many-to-one, or many-to-many manner and in which the correspondence is known.

According to the exhaust gas control apparatus of the internal combustion engine of the present invention, the adjusting device is controlled by the first controlling device to increase the exhaust gas recirculation amount in the HPL path if the specified methane concentration is greater than or equal to the reference value.

At this time, a criterion of the "increase" is the exhaust gas recirculation amount in the HPL path if the methane concentration in the exhaust gas is less than the reference value. Therefore, if the exhaust gas recirculation amount in the HPL path in the case where the methane concentration in the exhaust gas is less than the reference value is zero (if the exhaust gas is not recirculated in the HPL path), the first controlling device may only start the exhaust gas recirculation using the HPL path, from the fact that the methane concentration is greater than or equal to the reference value.

A practical control aspect of controlling the exhaust gas recirculation amount in the HPL path on the first controlling device is not limited as long as the exhaust gas recirculation amount can be changed to be larger or smaller than the reference value. For example, the exhaust gas recirculation amount can be changed in a binary manner, on the basis of the reference value. Alternatively, the exhaust gas recirculation amount may be changed, stepwise or gradually, or continuously, in a concentration range in which the methane concentration is greater than or equal to the reference value. The exhaust gas recirculation amount may be changed, stepwise or gradually, or continuously, in a concentration range in which the methane concentration is less than the reference value. The action of the first controlling device in this case is, namely, substantially equivalent to controlling the exhaust gas recirculation amount to be larger or smaller in accordance with the high or low methane concentration.

Here, the large or small exhaust gas recirculation amount in the HPL path can correspond to the high or low extent of the reduction of methane in the exhaust gas, respectively. In other words, the recirculated exhaust gas is resupplied from the intake passage into the cylinder, and the inside of the cylinder is exposed to a high-temperature atmosphere associated with the combustion of fuel. Since an in-cylinder temperature, which is mainly influenced by a combustion temperature, is higher than the temperature of the exhaust gas purifying apparatus in which an increase in temperature is promoted mainly due to exhaust heat, the re-combustion of methane is promoted in the inside of the cylinder which is in the high-temperature atmosphere, at least in comparison with a purification process of the exhaust gas purifying apparatus.

As described above, the exhaust gas control apparatus of the internal combustion engine of the present invention has a technical idea of reducing methane not by the purification reaction performed by the exhaust gas purifying apparatus but by the re-combustion in the inside of the cylinder, as an essential technical idea thereof. In the point of preferably promoting the reduction of methane, this technical idea is superior to any other technical ideas for removing methane using the exhaust gas purifying apparatus.

Incidentally, even if the HPL path is not used as the recirculation path for the exhaust gas, simply, even if the aforementioned LPL path is used, it is not impossible to burn methane in the exhaust gas in the inside of the cylinder.

The exhaust gas recirculated in the LPL path, however, is low-temperature and low-pressure, in comparison with the exhaust gas recirculated in the HPL path as described above. Therefore, the combustion reaction of methane in the inside of the cylinder is milder than in the case where the exhaust gas is recirculated in the HPL path. Moreover, the exhaust gas recirculation amount is significantly influenced by a pressure difference between an exhaust gas extraction site and the intake passage. Therefore, a maximum value of the exhaust gas recirculation amount in the case of using the relatively low-pressure LPL path is less than a maximum value in the case of using the HPL path.

In other words, at least in two points which are combustion easiness and the recirculation amount, the HPL path is superior to the LPL path. If it is considered only to reduce methane by performing in cylinder combustion of methane, there is no rational reason to select the LPL path in preference to the HPL path.

In addition, the exhaust gas control apparatus of the internal combustion engine of the present invention, said first specifying device specifies the methane concentration on the basis of the fuel to be used for the internal combustion engine.

The first specifying device specifies the methane concentration, on the basis of the fuel to be used, which is the "physical state which corresponds to the specification target in the one-to-one, one-to-many, many-to-one, or many-to-many manner" described above. In other words, according to this aspect, a correspondence between the fuel to be used and the methane concentration is known, and a fuel type is treated as an alternative to the methane concentration. The methane concentration is at least potentially specified.

Therefore, if the fuel to be used is fuel in which it is defined in advance that the methane concentration in the exhaust gas is greater than or equal to the reference value, the first controlling device can regard the methane concentration in the exhaust gas as being greater than or equal to the reference value, without specifying the methane concentration itself.

The methane concentration in the exhaust gas tends to depend significantly on the fuel type, although the methane concentration in the exhaust gas can change in one fuel type in accordance with a control aspect of the internal combustion engine, such as, for example, an air-fuel ratio.

Therefore, under the operating conditions using one fuel type, practically, there is almost no situation in which the methane concentration in the exhaust gas exceeds the reference value, or no similar situations, in accordance with the control aspect of the internal combustion engine. In view of this point, the measure of specifying the methane concentration based on the fuel type as described above is practically useful in that the accuracy of specifying the methane concentration can be ensured, necessarily and sufficiently (i.e. at least to the extent that the necessity of the exhaust gas recirculation using the HPL path can be accurately judged), while suppressing increased costs.

In one aspect of the exhaust gas control apparatus of the internal combustion engine of the present invention, said first specifying device may specify that the methane concentration is greater than or equal to the reference value if the fuel to be used is CNG.

In CNG, methane is a most part of fuel composition thereof. Therefore, a most part of methane in the exhaust gas is methane as unburned fuel, and methane has a high ratio in the THC in the exhaust gas. In other words, from the viewpoint of suppressing the emission of methane, CNG is one fuel which significantly requires the measure of promoting the in cylinder combustion of methane by the EGR.

In view of this point, if CNG is used as the fuel, even if it is judged that the methane concentration in the exhaust gas is greater than or equal to the reference value from the fact that CNG is used as the fuel, there is no problem in practice. In other words, the reference value associated with the methane concentration in the exhaust gas is a much lower value than a range which can be adopted by the methane concentration in the case where CNG is set as the fuel.

On the other hand, if CNG is set as the fuel, various particulate matters (PM), such as NMHC, black smoke, soot, NOx, or SOx, and PM generation factors also have a small amount of emission.

Therefore, if CNG is used as the fuel, the possibility of adhesion or deposition of deposits to the EGR passage caused by the use of the HPL path is extremely low, and there is practically almost no need to limit the exhaust gas recirculation amount in the HPL path from the viewpoint of the adhesion or deposition of the deposits. In other words, if CNG is set as the fuel, it is possible to promote the exhaust gas recirculation in the HPL path and to constantly reduce the methane concentration on the upstream side of the exhaust gas purifying apparatus.

In another aspect of the exhaust gas control apparatus of the internal combustion engine of the present invention, said first specifying device specifies the methane concentration on the basis of an alcohol concentration of the fuel.

According to this aspect, the first specifying device specifies the methane concentration on the basis of the alcohol concentration of the fuel. In other words, the fuel to be used in this case is preferably gasoline-alcohol blended fuel, and it is fuel in which the alcohol concentration in the fuel is variable. In this type of fuel, the high or low alcohol concentration corresponds to the high or low methane concentration, respectively. Thus, practically, there is no problem even if the alcohol concentration is treated as the methane concentration.

On the other hand, in the alcohol blended fuel, information about fuel properties including the alcohol concentration is required for fuel injection control, for the reason that a theoretical air-fuel ratio varies depending on the alcohol concentration, or for similar reasons. Therefore, if this type of fuel is used, the alcohol concentration of the fuel is known at the time of fueling or at a time point corresponding thereto.

Therefore, if the alcohol blended fuel is used as an alternative index of the methane concentration, there is almost no time lag in a process of specifying the methane concentration. In other words, it is possible to avoid a reduction in methane removal efficiency in a period corresponding to this type of time lag.

In another aspect of the exhaust gas control apparatus of the internal combustion engine of the present invention, the EGR passage can recirculate the exhaust gas in a LPL path which includes the exhaust gas purifying apparatus in addition to the HPL path, the vehicle further comprises a switching device capable of switching a recirculation path for the exhaust gas between the HPL path and the LPL path, and said exhaust gas control apparatus of the internal combustion engine comprises: a second specifying device for specifying a PM concentration of the exhaust gas; and a second controlling device for controlling the switching device to set the recirculation path to be the LPL path if the specified PM concentration is greater than or equal to a reference value.

According to this aspect, the EGR passage is configured to select the aforementioned LPL path in addition to the HPL path, by the action of a selecting device which can be configured as a valve apparatus having various aspects, such as, for example, a butterfly valve, a needle valve, a three-way valve, or an electromagnetic valve. In other words, so-called multi pressure loop (MPL) EGR is possible.

On the other hand, in the exhaust gas recirculation using the HPL path, it is necessary to solve the problem of the adhesion of deposition of the deposits of PM in the EGR passage, as described above. In practice, the PM concentration in the exhaust gas of CNG and high-alcohol-concentration liquid fuel is sufficiently low, and a process of specifying the PM concentration is not necessarily required at least in those fuel types; however, there could be a situation in which the PM concentration is not low enough to be ignored although the methane concentration is greater than or equal to the reference value, in some operating conditions of the internal combustion engine. In such as case, the use of the HPL path may cause the adhesion or deposition of the deposits in the EGR passage.

According to this aspect, the PM concentration in the exhaust gas is specified by the second specifying device. Moreover, the second controlling device controls the recirculation path for the exhaust gas to be the LPL path, if the specified PM concentration is greater than or equal to the reference value even if the methane concentration is greater than or equal to the reference value.

As described above, between the LPL path and the HPL path, the latter is effective due to the in cylinder combustion of methane; however, the in cylinder combustion of methane can be performed even in the former on one level or another. Therefore, according to this aspect, it is possible to certainly protect the EGR passage or the intake passage communicated therewith, while maintaining the in cylinder combustion as much as possible.

In another aspect of the exhaust gas control apparatus of the internal combustion engine of the present invention, the vehicle comprises, in the EGR passage, a cooling device capable of cooling the exhaust gas, and said exhaust gas control apparatus of the internal combustion engine comprises: a third specifying device for specifying an exhaust gas temperature in the EGR passage; and a third controlling device for controlling the cooling device and the adjusting device to minimize the methane concentration on the basis of the specified exhaust gas temperature and the specified methane concentration.

The exhaust gas recirculation amount in the HPL path is desired to be high from the viewpoint of reducing methane. However, if the in-cylinder temperature is continuously maintained in a relatively high-temperature range which is greater than or equal to the methane removal temperature described above, the exhaust gas recirculation amount suddenly drops in some cases, for example, due to the occurrence of knocking. Such an excessive temperature increase in the inside of the cylinder correlates with the temperature of the exhaust gas to be recirculated and the exhaust gas circulation amount. In other words, qualitatively speaking, in a situation in which a large amount of high-temperature exhaust gas is recirculated, for example, in a high-load operation or driving or in similar situations, such an excessive temperature increase easily occurs.

If the exhaust gas recirculation amount is forcibly limited due to the excessive temperature increase in the inside of the cylinder as described above (including cases where the exhaust gas recirculation amount is spontaneously limited not to cause the knocking and cases where the exhaust gas recirculation amount is forcibly limited due to the occurrence of the knocking), the methane removal efficiency is reduced although temperature conditions are sufficient.

According to this aspect, the exhaust gas temperature in the EGR passage is specified by the third specifying device, and the third controlling device controls the cooling device and the adjusting device to minimize the methane concentration in the exhaust gas on the basis of the specified exhaust gas temperature and the specified methane concentration.

Incidentally, the cooling device is, for example, a water-cooling or air-cooling EGR cooler disposed in the EGR passage. Preferably, the ability of cooling the recirculated exhaust gas is variable via control for a coolant amount, a cooling air amount, or the like.

Here, the expression, "to minimize the methane concentration", merely means that a control target is minimal, and practically includes a situation in which the methane concentration converges in a certain range including the minimum value. Moreover, the minimum value may not be a value set in advance, and may be a value which varies, as occasion demands, in a control process. For example, the third controlling device may feedback-control a controlled variable of the adjusting device for defining the recirculation amount and a controlled variable of the cooling device for defining the exhaust gas temperature, with the methane concentration set as the control target.

According to this aspect, such methane concentration optimization control enables a methane removal ability to be maintained, regardless of the operating conditions of the internal combustion engine, which is remarkably effective in suppressing the deterioration of emission.

The operation and other advantages of the present invention will become more apparent from embodiments explained below.

MODE FOR CARRYING OUT THE INVENTION

Embodiments of the Invention

Hereinafter, with reference to the drawings, preferred embodiments of the present invention will be explained.

First Embodiment

Configuration of Embodiment

Figure 1:
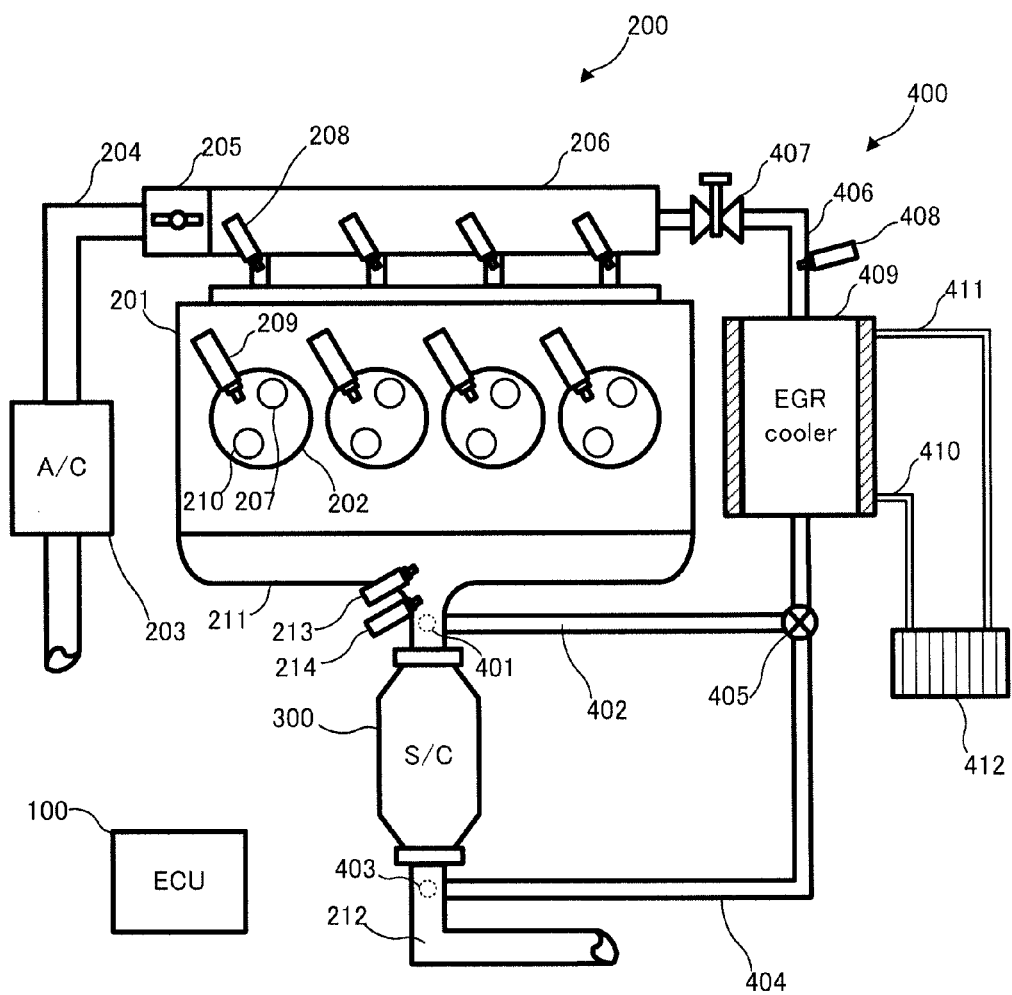
FIG. 1 is a schematic configuration diagram conceptually illustrating a configuration of an engine system in a first embodiment of the present invention.

Firstly, with reference to FIG. 1, a configuration of an engine system 10 in the first embodiment of the present invention will be explained. FIG. 1 is a schematic configuration diagram conceptually illustrating the configuration of the engine system 10.

In FIG. 1, the engine system 10 is mounted on a not-illustrated vehicle and is provided with an ECU 100, an engine 200, a three-way catalyst 300, and an EGR apparatus 400.

The ECU 100 is provided with a central processing unit (CPU), a read only memory (ROM), a random access memory (RAM), and the like. The ECU 100 is an electronic control unit configured to control operations of the engine 200 and the EGR apparatus 400. The ECU 100 is one example of the "exhaust gas control apparatus of the internal combustion engine" of the present invention. The ECU 100 is configured to preform methane reduction control described later, in accordance with a control program stored in the ROM.

Incidentally, the ECU 100 is a unified or integrated electronic control unit configured to function as one example of each of the "first specifying device", the "first controlling device", the "second specifying device", and the "second controlling device" of the present invention. The operations of each of the devices are all performed by the ECU 100. The physical, mechanical and electrical configurations of each of the devices of the present invention, however, are not limited to this, and each of the devices may be configured as various computer systems, such as, for example, a plurality of ECUs, various processing units, various controllers, or microcomputer apparatuses.

The engine 200 is a four cylinder engine which is one example of the "internal combustion engine" of the present invention.

The outline of the engine 200 will be explained. The engine 200 has such a configuration that four cylinders 200 are disposed in a cylinder block 201. A fuel-air mixture containing fuel, which is compressed in each cylinder in a compression stroke, is ignited by an ignition operation performed by a not-illustrated ignition apparatus and is burned. A force generated in the combustion reciprocates a not-illustrated piston in a direction perpendicular to the sheet of the drawing, and the reciprocating motion is further converted to a rotational motion of a crankshaft which is connected to the piston via a connecting rod (wherein the crankshaft and the connecting rod are not illustrated).

Here, a configuration of a main part of the engine 200 will be explained together with one portion of the operation thereof. Incidentally, the engine 200 in the first embodiment is an in-line four-cylinder engine in which the four cylinders 202 are arranged in parallel, in the direction perpendicular to the sheet of FIG. 1. Since the configurations of the individual cylinders 202 are equal to one another, only one cylinder 202 will be explained here.

Intake air sucked from the exterior via an air filter 203 is guided to an intake pipe which is one example of the "intake passage" of the present invention. The intake pipe 204 has a throttle valve 205 which is disposed in a predetermined manner and which can adjust the amount of the intake air. The throttle valve 205 is provided with a rotary valve which is electrically connected to the ECU 100 and which can be rotated by a driving force supplied from a throttle valve motor (not illustrated) controlled by the ECU 100. A rotational position of the throttle valve 205 is continuously controlled from a fully-closed position at which a communication is blocked between an upstream portion and a downstream portion of the intake pipe 204, to a fully-opened position at which the upstream portion and the downstream portion are completely communicated, wherein the throttle valve 205 forms a boundary between the upstream portion and the downstream portion.

The intake pipe 204 is connected to a surge tank 206, which is another example of the "intake passage" of the present invention, on the downstream side of the throttle valve 205 and is communicated in the inside of the surge tank 206. To the surge tank 206, a communication pipe (whose reference numeral is omitted) communicated with an intake port (not illustrated) corresponding to the each cylinder is connected. The intake port is configured to be communicated with the inside of the cylinder at the time of valve opening of an intake valve 207.

In the inside of the communication pipe, a fuel injection valve of a CNG injector 208 is exposed. The CNG injector 208 is a fuel supply apparatus capable of injecting CNG, which is one type of fuel of the engine 200, into the communication pipe. The CNG injector 208 is connected to a not-illustrated CNG tank for storing therein CNG in a gas state. Incidentally, the CNG injector 208 is electrically connected to the ECU 100, and an injection state of CNG in the communication pipe (whether or not CNG is injected, the amount of injection, etc.) is controlled by the ECU 100.

On the other hand, in a combustion chamber of the cylinder 202, a fuel injection valve of a direct injector 209 is exposed. From the fuel injection valve, liquid fuel as fuel can be atomized and injected. The direct injector 209 is electrically connected to the ECU 100, and an injection state of the liquid fuel via the direct injector 209 (whether or not CNG is injected, the amount of injection, etc.) is controlled by the ECU 100.

Here, the liquid fuel in the first embodiment is configured as blended fuel containing gasoline and ethanol. The percentage of ethanol content in the liquid fuel is variable in a range of 0% (E0 fuel, i.e. gasoline) to 100% (E100 fuel, i.e. ethanol). In a liquid fuel tank for storing therein the liquid fuel, an alcohol concentration sensor capable of detecting an ethanol concentration is attached thereto, and an ethanol concentration ETN of the liquid fuel at that time point is detected. Moreover, the alcohol concentration sensor is electrically connected to the ECU 100, the detected ethanol content ETN is referred to by the ECU 100, as occasion demands.

As described above, the engine 200 has flexibility in a blend ratio of gasoline and ethanol, and constitutes one example of a so-called flexible fuel (FF) engine. Moreover, the engine 200 constitutes one example of a so-called CNG bi-fuel engine which can use CNG and liquid fuel as fuel.

Burned gas which has passed through a combustion stroke in each cylinder (which merely means that the gas has passed through the combustion stroke and does not define whether or not complete combustion is provided) is discharged into an exhaust manifold 211 via an exhaust valve in an exhaust stroke. To the exhaust manifold 211, an exhaust pipe 212, which is one example of the "exhaust passage" of the present invention, is connected. The burned gas flows downstream in the exhaust pipe 212 as exhaust gas.

In the exhaust pipe 212, the three-way catalyst 300 is placed. The three-way catalyst 300 is one example of the "exhaust gas purifying apparatus" of the present invention, configured to simultaneously remove NOx, CO, and HC by oxidizing and burning CO and HC in the exhaust gas using oxygen obtained from the reduction of NOx in the exhaust gas guided to the exhaust pipe 212 via the exhaust manifold 211.

Moreover, in a downstream position of the exhaust manifold in the exhaust pipe 212, an air-fuel ratio sensor 213 is placed. The air-fuel ratio sensor 213 is a linear air-fuel ratio sensor capable of detecting an exhaust air-fuel ratio AF at the exit of the exhaust manifold 211. The air-fuel ratio sensor 213 is electrically connected to the ECU 100, and the detected exhaust air-fuel ratio AF is referred to by the ECU 100 as occasion demands.

Moreover, on the upstream side of the three-way catalyst 300 in the exhaust pipe 212, a PM sensor 214 capable of detecting a PM concentration in the exhaust gas is disposed in a predetermined manner. The PM sensor 214 is electrically connected to the ECU 100, and the detected PM concentration pm is referred to by the ECU 100 as occasion demands.

Incidentally, illustration is omitted, but a in-cylinder pressure sensor capable of detecting an in-cylinder pressure Pcly is placed. The in-cylinder pressure sensor is electrically connected to the ECU 100, and the detected in-cylinder pressure Pcly is referred to by the ECU 100 as occasion demands.

The EGR apparatus 400 is provided with a HPLEGR passage 402, a LPLEGR passage 404, a switching valve 405, a common EGR passage 406, an EGR valve 407, a temperature sensor 408, and an EGR cooler 409. The EGR apparatus 400 is an exhaust gas recirculating apparatus for recirculating or returning the exhaust gas to an intake system (incidentally, this measure is referred to as "EGR", as occasion demands).

The HPLEGR passage 402 is a tubular member connected to the exhaust passage (or pipe) 212 at a HPL branch point 401 disposed on the upstream side of the three-way catalyst 300 (on the exhaust manifold 211 side). The HPLEGR passage 402 has the other end connected to the common EGR passage 406.

The LPLEGR passage 404 is a tubular member connected to the exhaust passage (or pipe) 212 at a LPL branch point 403 disposed on the downstream side of the three-way catalyst 300 (on the side opposite to the exhaust manifold 211). The LPLEGR passage 404 has the other end connected to the common EGR passage 406.

The switching valve 405 is disposed at a connection point of the HPLEGR passage 402, the LPLEGR passage 404 and the common EGR passage 406. The switching valve 405 is a three-way valve apparatus which is one example of the "switching device" of the present invention, configured to switch a communication state of the passages.

More specifically, the switching valve 405 can adopt, as a valve element position for changing an inner valve element by rotating it, two valve element positions which are a HPL selection position for communicating the HPLEGR passage 402 and the common EGR passage 406 and blocking the communication between the LPLEGR passage 404 and the common EGR passage 406, and a LPL selection position for communicating the LPLEGR passage 404 and the common EGR passage 406 and blocking the communication between the HPLEGR passage 402 and the common EGR passage 406. A drive system for rotationally driving the valve element of the switching valve 405 is electrically connected to the ECU 100, and the valve element position is controlled by the ECU 100.

The common EGR passage 406 is a tubular member having one end connected to the HPLEGR passage 402 and the LPLEGR passage 404 and the other end connected to the surge tank 206. The common EGR passage 406 can recirculate the exhaust gas as EGR gas from the exhaust pipe 212 to the surge tank 206 via one of the passages communicated by the switching valve 405 at that time point.

Here, if the switching valve 405 adopts the HPL selection position, the EGR gas is guided to the HPLEGR passage 402 on the upstream side of the three-way catalyst 300, and is recirculated to the surge tank 206 via the common EGR passage 406. In other words, in this case, the EGR gas is returned to the intake passage while maintaining a high-pressure state led to the exhaust manifold 211, without pressure loss in the three-way catalyst 300. Hereinafter, a recirculation path for the EGR gas is referred to as a "HPL path", and the recirculation of the exhaust gas using the HPL path is referred to as "HPLEGR", as occasion demands.

On the other hand, if the switching valve 405 adopts the LPL selection position, the EGR gas is guided to the LPLEGR passage 404 on the downstream side of the three-way catalyst 300, and is recirculated to the surge tank 206 via the common EGR passage 406. In other words, in this case, the EGR gas is returned to the intake passage in a clean state after the exhaust gas purification performed by the three-way catalyst 300, while being subject to proper pressure loss and cooling in the three-way catalyst 300. Hereinafter, the recirculation path for the EGR gas is referred to as a "LPL path", and the recirculation of the exhaust gas using the LPL path is referred to as "LPLEGR", as occasion demands.

Incidentally, the HPLEGR passage 402, the LPLEGR passage 404, and the common EGR passage 406 are one example of the "EGR passage" of the present invention for recirculating the exhaust gas to the intake passage.

The EGR valve 407 is an electromagnetic opening/closing valve disposed on the common EGR passage 406, as one example of the "adjusting device" of the present invention. The EGR valve 407 can selectively switch an opening degree of a valve element thereof, among a fully-closed opening degree for blocking the communication of the intake and exhaust passages via the common EGR passage 406, a fully-opened opening degree for completely communicating the intake and exhaust passages, and a plurality of intermediate opening degrees as an intermediate state of the fully-closed and fully-opened opening degrees. A drive system for driving the valve element of the EGR valve 407 is electrically connected to the ECU 100, and an EGR opening degree, which is the opening degree of the valve element of the EGR valve 407, is controlled by the ECU 100.

The temperature sensor 408 is a sensor configured to detect an EGR gas temperature Tegr which is the temperature of the EGR gas. The temperature sensor 408 is electrically connected to the ECU 100, and the detected EGR gas temperature Tegr is referred to by the ECU 100, as occasion demands.

The EGR cooler 409 is a cooling apparatus disposed in the common EGR passage on the upstream side of the temperature sensor 408 (in this case, on the switching valve 405 side). The EGR cooler 409 is a water cooling apparatus in which a water jacket for circulating a coolant is put around an outer wall portion thereof. The EGR gas is cooled by heat exchange via the outer wall portion, which is performed in a circulation process of the coolant.

Incidentally, the water jacket is configured to circulate the coolant by that the coolant flows in from a supply-side pipe 410 and flows out from a drain-side pipe 411. In the circulation path of the coolant, an EGR radiator 412 is placed. The EGR radiator 412 is a temperature adjusting apparatus having a radiating fin and configured to maintain the coolant at a substantially constant temperature due to the radiation of heat from the radiating fin. Incidentally, the EGR cooler 409 is electrically connected to the ECU 100, and a circulation amount of the coolant is variably controlled by the ECU 100. Moreover, the ECU 100 can also stop the circulation of the coolant. If the circulation of the coolant is stopped, the EGR gas cooling of the EGR cooler 409 is stopped.

Operations of Embodiment

Operations of the first embodiment will be explained.
<Outline of Methane Reduction Control>

The engine 200 in the first embodiment can use CNG and liquid fuel as fuel. They are both fuel containing methane in the exhaust gas. In particular, CNG and high ethanol concentration liquid fuel (e.g. E85 fuel, E100 fuel, etc.) have a high methane ratio in TCH in the exhaust gas.

Figure 2:
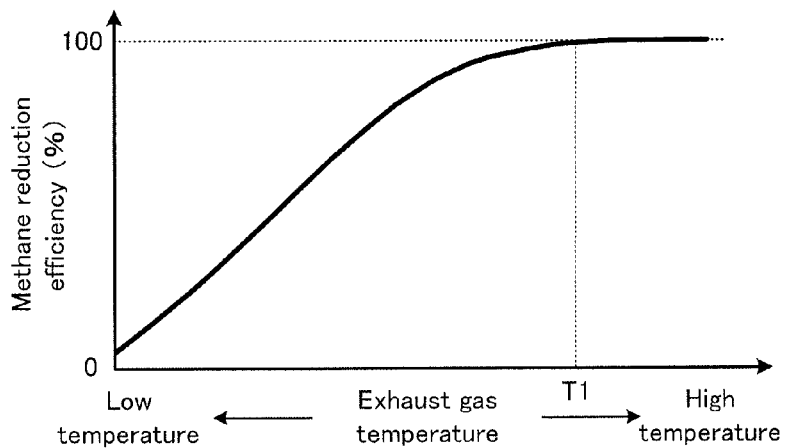
FIG. 2 is a diagram illustrating a relation between exhaust gas temperature and methane removal efficiency.

Now, with reference to FIG. 2, methane removal characteristics with respect to exhaust gas temperature will be explained. FIG. 2 is a diagram illustrating a relation between exhaust gas temperature and methane removal efficiency.

In FIG. 2, a vertical axis thereof illustrates a methane concentration, and a horizontal axis thereof illustrates the exhaust gas temperature. T1 on the horizontal axis indicates a 99% removal temperature, which is an exhaust temperature at which 99% of methane in the exhaust gas is removed. The 99% removal temperature T1 is normally in a high-temperature region of 800 degrees C. or higher.

On the other hand, cases where the exhaust temperature increases to this type of high-temperature region (e.g. a temperature region of 800 degrees C. or higher) are limited to one portion of operating conditions of the engine 200, such as, for example, cases where high-load driving continues for a predetermine period of time.

Thus, the three-way catalyst 300, in which the temperature thereof is increased mainly by the exhaust gas temperature and heat of reaction, hardly becomes into a temperature state in which methane can be sufficiently removed, in a normal operating region of the engine 200. If the three-way catalyst 300 is relied on for the removal of methane, the reduction of methane possibly becomes insufficient.

Thus, in the engine system 10 in the first embodiment, the methane reduction control is performed by the ECU 100. Methane in the exhaust gas is recirculated to the intake passage by the action of the EGR apparatus 400 and is used for the combustion in the inside of the cylinder 202, by which the reduction of methane is promoted.
<Details of Methane Reduction Control>

Figure 3:
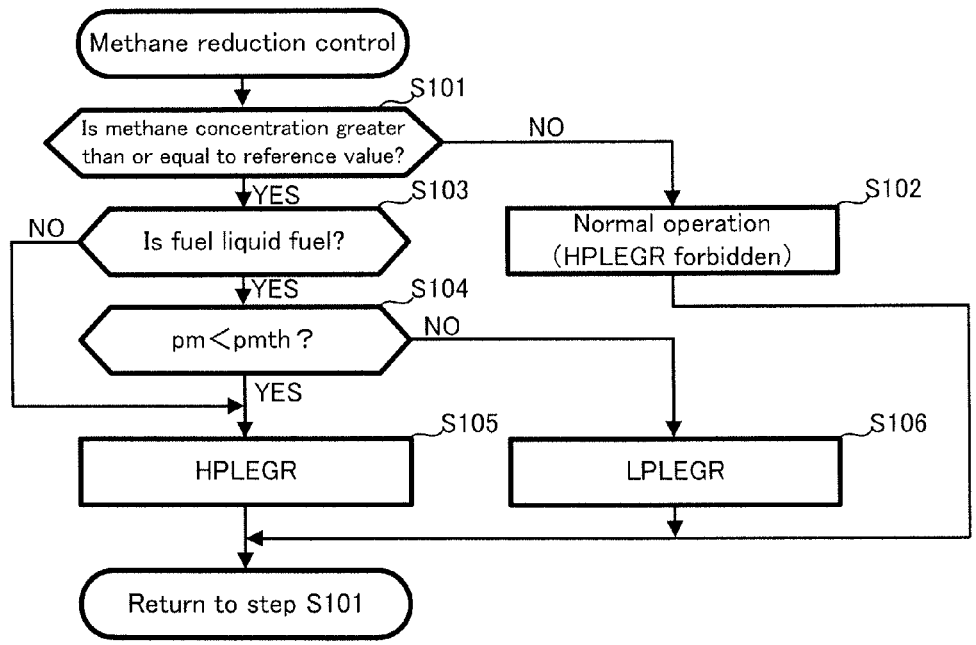
FIG. 3 is a flowchart illustrating methane reduction control performed in the engine system in FIG. 1.

Now, with reference to FIG. 3, the details of the methane reduction control performed by the ECU 100 will be explained. FIG. 3 is a flowchart illustrating the methane reduction control.

In FIG. 3, the ECU 100 judges whether or not the methane concentration in the exhaust gas is greater than or equal to a reference value (step S101).

The reference value of the methane concentration is a value experimentally defined in advance as a value in which the methane concentration in tailpipe emission (or emission discharged out of the vehicle) can exceed an allowable value if the removal of methane is performed by the three-way catalyst 300.

Here, as described above, CNG has a high methane concentration in the exhaust gas. Thus, when CNG is selected as fuel, it has been already judged that the methane concentration in the exhaust gas is greater than or equal to the reference value (i.e. the reference value is determined such that the relevant judgment is established). Therefore, if CNG is selected as fuel, a time required for the processing in the step S101 can be reduced.

Incidentally, more strictly speaking, the methane concentration in the exhaust gas can vary depending on the detailed operating conditions of the engine 200, such as, for example, the air-fuel ratio; however, broadly speaking, the methane concentration in the exhaust gas depends significantly on the type of fuel. Therefore, even if alternative concentration estimation using the fuel type is performed as described above, the accuracy of estimation of the methane concentration required for the step S101, which defines whether or not in cylinder combustion of methane is to be promoted, is ensured, practically sufficiently.

If, however, the air-fuel ratio is considered, it is obvious that the methane concentration is more accurately specified; therefore this type of measure may be also taken. In this case, the exhaust air-fuel ratio AF detected by the air-fuel ratio sensor 213 can be used.

Moreover, the methane concentration in the exhaust gas in the liquid fuel depends on the ethanol concentration ETN in the liquid fuel. Therefore, if a relation between the ethanol concentration ETN and the methane concentration in the exhaust gas is defined in advance, it is possible to quickly and accurately perform the judgment of whether or not the methane concentration in the exhaust gas is greater than or equal to the reference value, on the basis of the ethanol concentration ETN as one type of fuel property, which has been already detected, for example, at the time of fueling or the like.

In the first embodiment, the relation between the ethanol concentration ETN and the methane concentration is provided by a map stored in the ROM in advance. If the fuel to be used is the liquid fuel, the ECU 100 estimates the methane concentration on the basis of the ethanol concentration ETN. Alternatively, a reference value suitable for the ethanol concentration ETN may be set as an alternative index value of the methane concentration.

As described above, in the first embodiment, when the step S101 is performed, the methane concentration in the exhaust gas is not detected. Even by the estimation based on the fuel type, or the measure of treating the fuel type as the methane concentration or similar measures, it is possible to perform necessary and sufficient estimation of the methane concentration. The operation in the step S101 is one example of the "fist specifying device" or the "second specifying device" of the present invention.

If it is judged that the methane concentration is less than the reference value for the reason that the fuel to be used is gasoline (E0 fuel), or that the ethanol concentration in the liquid fuel has a concentration value corresponding to the methane concentration that is less than the reference value or for similar reasons (the step S101: NO), the ECU 100 performs normal operation (step S102).

The normal operation means operation control of the engine 200 which does not pay attention to the reduction of methane in the exhaust gas caused by the promotion of the cylinder combustion, and the normal operation does not necessarily define the necessity of EGR. In other words, from the viewpoint of NOx reduction, suppression of an in-cylinder temperature, or the like (simply meaning EGR control in a normal gasoline engine or the like), EGR may be performed, as occasion demands.

In the normal operation, however, HPLEGR is forbidden. This is to prevent PM in the exhaust gas from being adhered to or deposited to each part of the EGR apparatus 400, which defines the HPL path, as deposits.

If the step S102 is performed, the processing is returned to the step S101. In other words, as long as the methane concentration is less than the reference value (e.g. in cases where gasoline is continuously used as fuel or in similar cases), the normal operation is continued.

In the step S101, for example, if it is judged that the methane concentration is greater than or equal to the reference value for the reason that the fuel to be used is CNG, or that the ethanol concentration in the liquid fuel has a concentration value corresponding to the methane concentration that is greater than or equal to the reference value or for similar reasons (the step S101: YES), the ECU 100 judges whether or not the fuel is the liquid fuel (step S103).

If the fuel is not the liquid fuel (the step S103: NO), i.e. if the fuel is CNG, the ECU 100 unconditionally controls the switching valve 405 to be at the HPL selection position and performs HPLEGR (step S105).

On the other hand, if the fuel is the liquid fuel (the step S103: YES), the ECU 100 further judges whether or not the PM concentration pm in the exhaust gas is less than a reference value pmth (step S104). The reference value pmth is a critical concentration corresponding to that the selection of the HPL path is allowed from the viewpoint of preventing the adhesion or deposition of the deposits, and the reference value pmth is experimentally determined.

If the PM concentration pm in the exhaust gas is less than the reference value pmth (the step S104: YES), the ECU 100 controls the switching valve 405 to be at the HPL selection position, and performs HPLEGR as in cases where CNG is used as fuel (step S105).

Moreover, if the PM concentration pm in the exhaust gas is greater than or equal to the reference value pmth (the step S104: NO), the ECU 100 controls the switching valve 405 to be at the LPL selection position and performs LPLEGR (step S106).

Here, in the step S105 and the step S106, EGR is performed for the purpose of promoting the in cylinder combustion of methane and purifying exhaust emission, and thus, EGR is basically always continued in those steps.

Incidentally, in the first embodiment, HPLEGR is not performed if the methane concentration in the exhaust gas is less than the reference value. In other words, if the methane concentration in the exhaust gas is less than the reference value, an EGR amount associated with HPLEGR is zero. Therefore, regardless of the extent of the EGR amount associated with HPLEGR, the EGR amount is higher than that obtained in cases where the methane concentration is less than the reference value. This is one example of the operation of the first controlling device of "increasing an exhaust gas recirculation amount in the HPL path if the methane is greater than or equal to the reference value".

Incidentally, in the normal operation in the step S102, HPLEGR may not be forbidden, but the measure of significantly limiting HPLEGR or similar measures may be taken. In this case, there may be cases where the exhaust gas recirculation amount obtained when the methane concentration is less than the reference value is not zero. However, considering that HPLEGR is allowed only in the restriction of preventing the adhesion of the deposits, the EGR amount associated with HPLEGR in the normal operation in the step S102 is sufficiently small, in comparison with the EGR amount associated with HPLEGR in the step S105 which aims at the promotion of the in cylinder combustion of methane. That is, even in this case, the operation concept of the first controlling device of the present invention is ensured.

Incidentally, in the first embodiment, in the step S104, the PM concentration pm detected by the PM sensor 214 is referred to, and thus, the accurate PM concentration which reflects the operating conditions of the engine 200 at that time point can be known. The PM concentration pm in the exhaust gas, however, can be also simply estimated on the basis of the ethanol concentration ETN. In other words, if an ethanol concentration ETNth corresponding to the reference value pmth of the PM concentration is determined in advance, the judgment processing in the step S104 can be performed using a magnitude correlation between the ethanol concentrations ETN and ETNth. Incidentally, as is clear from that the step S105 is unconditionally performed if the step S103 is "NO", if the fuel is CNG, there is little PM in the exhaust gas. In this case, therefore, the estimation of the PM concentration is not required.

Figure 4:
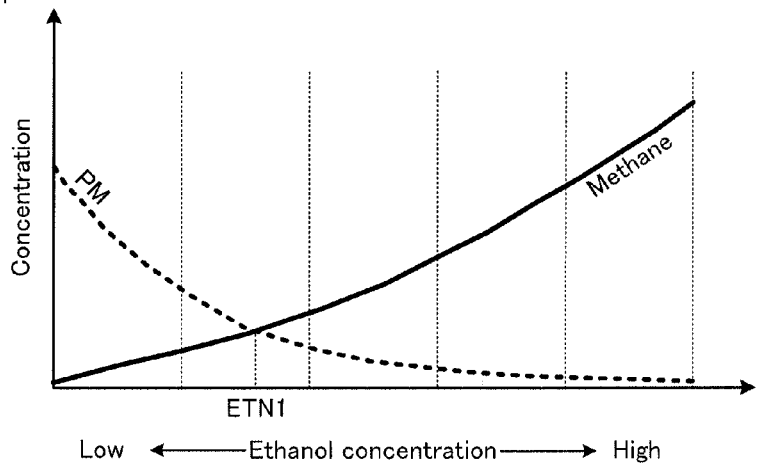
FIG. 4 is a diagram illustrating a relation between an alcohol concentration in liquid fuel, a methane concentration, and a PM concentration.

Now, with reference to FIG. 4, a relation between the ethanol concentration ETN in the liquid fuel and the PM concentration pm will be explained. FIG. 4 is a diagram illustrating a relation between the ethanol concentration in the fuel and the methane concentration and the PM concentration in the exhaust gas.

As is clear from FIG. 4, the behavior of the liquid fuel to the ethanol concentration is opposite between the PM concentration and the methane concentration; namely, the PM concentration is high (low) and the methane concentration is low (high) in an area having a low (high) ethanol concentration. This is due to that the liquid fuel is the ethanol-gasoline blended fuel.

In other words, a reduction in the ethanol concentration in the liquid fuel means that the fuel comes close to gasoline (E0 fuel). The PM is, for example, unburned HC, a solid-state carbon component (soot) in a steamed baked state in an oxygen-deficient atmosphere, a SOF component, or the like, and the PM is typically a particulate matter generated from materials derived from gasoline. Moreover, the ratio of methane occupying in THC in the exhaust gas of gasoline is low. Therefore, as the ethanol concentration decreases, the PM concentration increases, and the methane concentration decreases.

On the other hand, an increase in the ethanol concentration in the liquid fuel means that the fuel comes close to pure ethanol (E100 fuel). Ethanol rarely contains PM and PM generation factors in the exhaust gas, as in the case of CNG or the like. Therefore, as the ethanol concentration increases, the methane concentration increases, and the PM concentration decreases.

Ere, the PM concentration and the methane concentration have an opposite relation, and thus, those concentrations can be similar to each other at one ethanol concentration ETN. If this ethanol concentration is ETN1, the methane concentration in the exhaust gas is greater than the PM concentration in an area having a higher ethanol concentration than ETN1. On the other hand, the PM concentration in the exhaust gas is greater than the methane concentration in an area having a lower ethanol concentration than ETN1.

Therefore, the following judgment can apply; namely, if a relation of ETN≥ETN1 applies, the reduction of methane is to be prioritized, and if a relation of ETN<ETN1 applies, the prevention of the adhesion or deposition of the deposits is to be prioritized. The reference value pm of the PM concentration described above may be defined as a PM concentration corresponding to the ethanol concentration ETN1, with ETN1 set as ETNth.

Incidentally, it is obvious that the ethanol concentration ETN in which it is judged that the methane concentration is greater than or equal to the reference value in the step S101 is on a lower concentration side of not only ETN1 but also the reference value associated with the selection of HPLEGR and LPLEGR.

As explained above, according to the methane reduction control in the first embodiment, if the methane concentration in the exhaust gas is greater than or equal to the reference value, the in cylinder combustion of methane using the EGR apparatus 400 is promoted. In particular, under the condition that the PM concentration pm in the exhaust gas is less than the reference value pmth, i.e. under the condition that the deposits are not adhered to or deposited to each part of the EGR apparatus 400, HPLEGR using the HPL path is selected.

HPLEGR is high-pressure and high-temperature in comparison with LPLEGR, because pressure reduction and temperature reduction caused by the three-way catalyst 300 are avoided. HPLEGR can maintain the temperature of the inside of the cylinder 202 at as high temperature as possible, or can increase the temperature, as well as recirculating a larger amount of exhaust gas. Therefore, the in cylinder combustion of methane is preferably promoted, by which methane can be preferably reduced.

Incidentally, in the methane reduction control in the first embodiment, an in-cylinder temperature Tcyl as the temperature of the combustion chamber of the cylinder 202 is not referred to. Considering that high temperature is required to remove methane, as exemplified in FIG. 2, it is also possible to add such a condition that the in-cylinder temperature Tcyl is greater than or equal to a reference value (Tcylth), to requirements for the methane reduction control.

The reference value Tcylth may be a value experimentally set as a temperature for judging whether or not methane combustion (in cylinder combustion) in the inside of the cylinder 202 sufficiently proceeds, or in other words, whether or not HPLEGR effectively functions. Moreover, the reference value Tcylth may be, for example, the 99% removal temperature T1 described above, if it is premised that EGR is performed only when the in cylinder combustion of methane can be certainly performed. Moreover, from the viewpoint of promoting the in cylinder combustion of methane to some extent, the reference value Tcylth may be a value on a lower temperature side of the 99% removal temperature T1.

Incidentally, the in-cylinder temperature Tcyl can be estimated on the basis of the in-cylinder pressure Pcyl. More specifically, in the ROM of the ECU 100, an in-cylinder temperature map which associates the in-cylinder pressure Pcyl with the in-cylinder temperature Tcyl is stored in advance. The ECU 100 may estimate the in-cylinder temperature Tcyl by selecting one in-cylinder temperature Tcyl corresponding to the in-cylinder pressure Pcyl detected by the in-cylinder pressure sensor at a time point of the detection.

Second Embodiment

Figure 5:
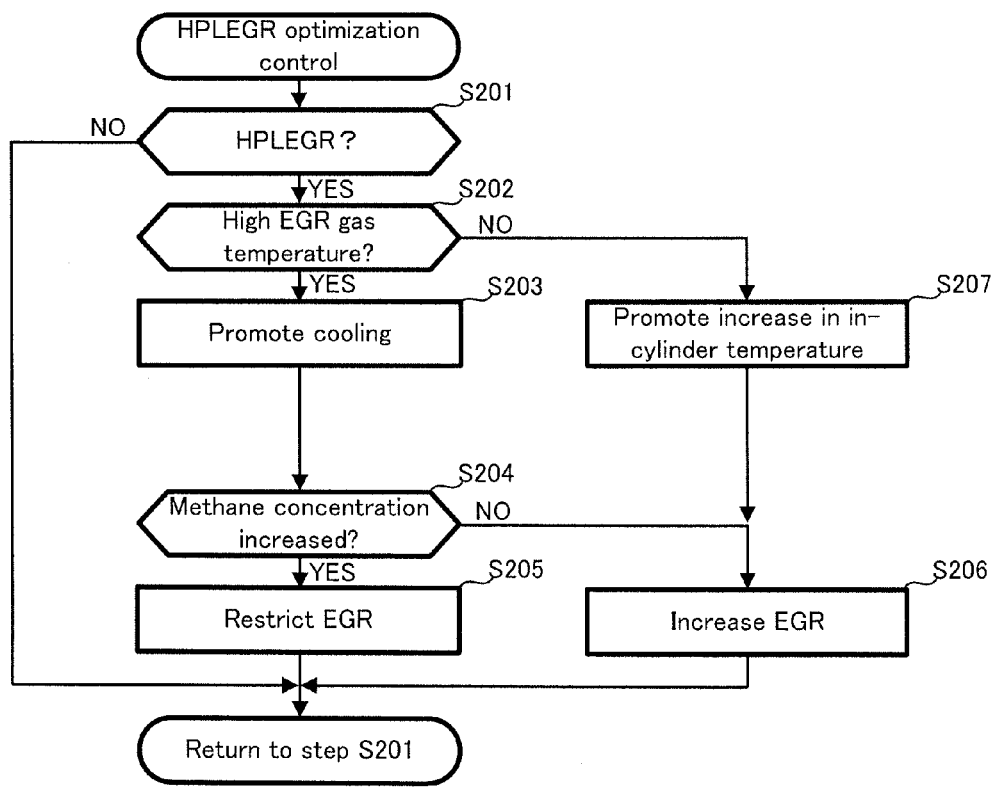
FIG. 5 is a flowchart illustrating HPLEGR optimization control in a second embodiment of the present invention.

Next, with reference to FIG. 5, as a second embodiment of the present invention, HPLEGR optimization control performed by the ECU 100 will be explained. FIG. 5 is a flowchart illustrating the HPLEGR optimization control.

Incidentally, the HPLEGR optimization control is control for minimizing the methane concentration in the exhaust gas on the upstream side of the three-way catalyst 300, and is one example of the operations of the "third specifying device" and the "third controlling device" of the present invention.

A system configuration in the second embodiment is assumed to be basically the same as that in the first embodiment.

In FIG. 5, the ECU 100 judges whether or not HPLEGR is being performed (step S201). If HPLEGR is not being performed (the step S201: NO), the ECU 100 repeatedly performs the step S201 and makes the processing substantially in a standby state.

If HPLEGR is being performed (the step S201: YES), the ECU 100 judges whether or not the EGR gas temperature is high-temperature (step S202). At this time, the ECU 100 compares the EGR gas temperature Tegr with a reference value.

If the EGR gas temperature is high-temperature (the step S202: YES), the ECU 100 increases the amount of flow of the coolant of the EGR cooler 409 and promotes the cooling of the EGR gas (step S203).

On the other hand, after promoting the cooling of the EGR gas, the ECU 100 judges whether or not the methane concentration in the exhaust gas is increased (step S204). Incidentally, the ECU 100 calculates the methane concentration in the exhaust gas with a regular period, on the basis of the type of the fuel to be used (fuel type) and the exhaust air-fuel ratio AF. In the step S204, the latest value of the methane concentration calculated in this manner is compared with a previous value.

If the methane concentration is increased (the step S204: YES), the inside of the cylinder 202 becomes excessively high-temperature. Taking the excessively high temperature as being in a situation in which there is knocking or abnormal combustion which induces the knocking, the ECU 100 drives the EGR valve 407 to a valve opening side and limits the EGR amount (step S205).

If the EGR amount is limited, the throttle valve 205 which has been driven to the valve opening side in order to compensate for the oxygen deficiency in the cylinder caused by the EGR can be driven to a valve closing side, and an engine load moves to a light load side. Thus, an in-cylinder temperature reduction effect can be obtained.

In the step S204, if the methane concentration is not increased (the step S204: NO), the ECU 100 increases the EGR amount (step S206). In other words, the reduction of methane is promoted due to the increased EGR amount. If the step S205 or the step S206 is performed, the processing returns to the step S201.

On the other hand, in the step S202, if the EGR gas temperature is not high-temperature (the step S202: NO), the ECU 100 reduces the amount of the coolant of the EGR cooler 409 and increases the temperature of the EGR gas, thereby promoting an increase in the in-cylinder temperature (step S207).

If the step S207 is performed, the processing is moved to the step S206 to increase the EGR amount.

As described above, according to the HPLEGR optimization control, the EGR gas temperature and the EGR amount are feedback-controlled on the basis of the amount of change in the methane concentration, and the methane concentration is maintained at a minimum value under the restriction of the operating conditions of the engine 200. Thus, the effect of the methane reduction can be maximized.

Incidentally, in the step S202, in order to prevent hunting, the cooling state of the EGR apparatus 400 may be maintained if the EGR gas temperature is in a predetermined range. In other words, the cooling may be promoted if the EGR gas temperature is higher than the predetermined range, and the increase in the in-cylinder temperature may be promoted if the EGR gas temperature is lower than the predetermined range.

The present invention is not limited to the aforementioned embodiment, but various changes may be made, if desired, without departing from the essence or spirit of the invention which can be read from the claims and the entire specification. An exhaust gas control apparatus of an internal combustion engine, which involves such changes, is also intended to be within the technical scope of the present invention.

INDUSTRIAL APPLICABILITY

The exhaust gas control apparatus of the internal combustion engine of the present invention can be used for methane reduction in exhaust gas of an internal combustion engine which can use fuel containing methane in the exhaust gas.

DESCRIPTION OF REFERENCE CODES

10 engine system
100 ECU
200 engine
300 three-way catalyst
400 EGR apparatus
402 HPLEGR passage
404 LPLEGR passage
405 switching valve
406 common EGR passage

The invention claimed is:

1. An exhaust system of an internal combustion engine of a vehicle, the internal combustion engine using a fuel, the fuel including at least one of a fuel containing methane and a fuel when burned producing methane in exhaust gas, the exhaust system comprising:
    an exhaust gas purifier disposed in an exhaust passage of the internal combustion engine;
    an EGR passage which recirculates the exhaust gas to an intake passage of the internal combustion engine, in a HPL path which does not include the exhaust gas purifier;
    a first valve which can adjust an exhaust gas recirculation amount in the EGR passage; and
    a controller including instructions which when executed perform the steps of:
        specifying a methane concentration in the exhaust gas on the basis of the fuel to be used for the internal combustion engine; and
        controlling the first valve to increase an exhaust gas recirculation amount in the HPL path if the specified methane concentration is greater than or equal to a reference value.

2. The exhaust system of the internal combustion engine according to claim 1, wherein said controller includes further instructions which when executed perform the step of specifying that the methane concentration is greater than or equal to the reference value if the fuel to be used is CNG.

3. The exhaust system of the internal combustion engine according to claim 1, wherein said controller includes further instructions which when executed perform the step of specifying the methane concentration on the basis of an alcohol concentration of the fuel.

4. The exhaust system of the internal combustion engine according to claim 1, wherein the EGR passage recirculates the exhaust gas in a LPL path which includes the exhaust gas purifier in addition to the HPL path, and further comprising:
    a second valve capable of switching a recirculation path for the exhaust gas between the HPL path and the LPL path, and the controller includes further instructions which when executed perform the steps of specifying a PM concentration of the exhaust gas; and
    controlling the second valve to set the recirculation path to be the LPL path if the specified PM concentration is greater than or equal to a reference value.

5. The exhaust system of the internal combustion engine according to claim 1, further comprising a cooler in the EGR passage and the controller includes further instructions which when executed performs the steps of specifying an exhaust gas temperature in the EGR passage; and controlling the cooler, and the first valve to minimize the methane concentration on the basis of the specified exhaust gas temperature and the specified methane concentration.

* * * * *